Sept. 5, 1950   H. T. CORBELL   2,521,045
SCARIFIER TOOTH
Filed April 11, 1947

INVENTOR.
HARRY T. CORBELL
BY
Mason, Fenwick & Lawrence
ATTORNEYS

Patented Sept. 5, 1950

2,521,045

UNITED STATES PATENT OFFICE 2,521,045

SCARIFIER TOOTH

Harry T. Corbell, Cologne, Va.

Application April 11, 1947, Serial No. 740,821

2 Claims. (Cl. 262—8)

This invention relates to removable teeth for scarifiers.

The scarifiers now in use are usually provided with removable teeth which have a vertical recess usually T-shaped in cross section. These teeth are driven on the lower ends of downwardly extending struts fixed to a suitable frame. The excessive strain imposed upon the teeth in operation soon causes the teeth to become loosened on the strut and the utility of the teeth is lost long before they become exteriorly worn to any degree.

The object of the present invention is to provide a removable scarifier tooth which will be capable of adjustment to take up for interior wear, whereby the tooth may be maintained in tight relationship with its supporting strut throughout an indefinite period of use.

Another object of the present invention is to provide such a tooth which is designed to secure the utmost rigidity and strength through its fitted relationship with its companion strut.

A further object of the invention is to provide such a tooth which is extremely rugged in construction, simple to manufacture, and easy to apply to and maintain in rigid relationship with its companion strut member.

Other objects of the invention will be apparent from the following detailed description when taken in conjunction with the drawings which accompany and form a part of this specification.

Figure 1:
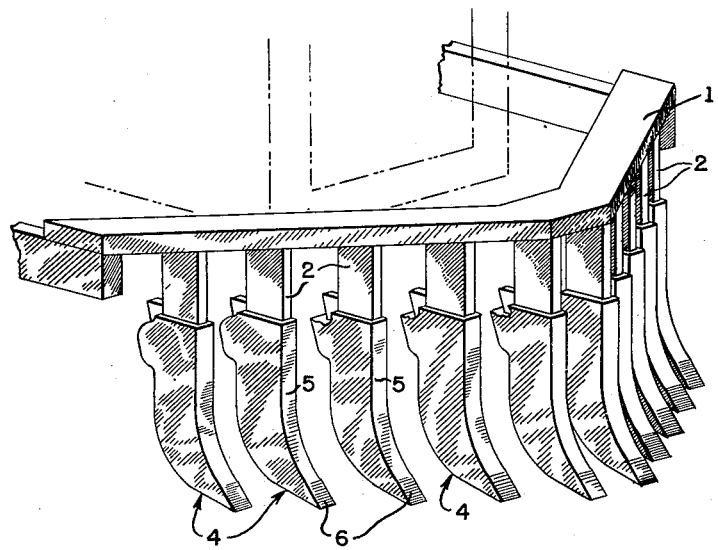
Figure 1 is a perspective view of the scarifier employing the teeth of the present invention.
Figure 2:
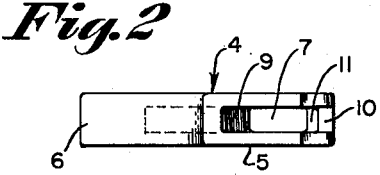
Figure 2 is a top plan view of one of the teeth.
Figure 3:
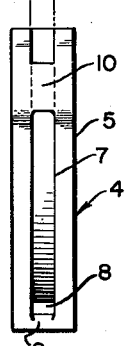
Figure 3 is a rear elevation of a tooth.
Figure 4:
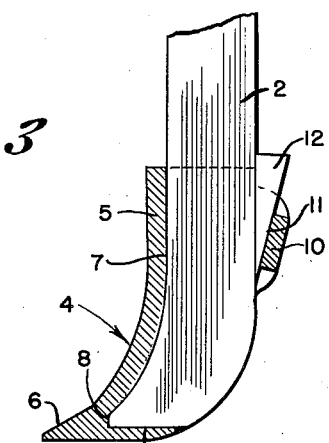
Figure 4 is a vertical section through a tooth mounted on a supporting strut.

Referring to the drawings in detail, the scarifier is shown as comprising a frame 1 which is substantially V-shaped and adapted to be attached to a tractor or other carrying means. At spaced points along the under side of the V-shaped frame downwardly extending struts 2 are fixed, the struts being rectangular in cross section and having their lower ends curved forwardly and tapered to form a toe.

Each of the struts is adapted to be tipped with a tooth 4. These teeth comprise a body portion having a vertical shank 5 which curves forwardly at the bottom to form a ground-engaging point 6. The entire shank is recessed at the rear as at 7, the recess following closely the outer contour of the tooth and projecting into the point portion to form a pocket 8. The recess is of such size and shape that the lower end of the supporting strut 2 will completely fill the recess when the tooth is in position on the strut. The toe portion of the strut fits into the pocket 8 and a portion of the metal forming the point projects rearwardly forming a skid 9 to keep the lower portion of the supporting strut from contact with the ground.

The tooth is provided with a strap 10 which bridges the outer edges of recess 7 and is provided with an inclined surface 11 which forms a bearing surface for a wedge 12 which is adapted to be driven between the strap 10 and the back of the supporting strut 2 to force the strut into tight engagement with the inner surface of the recess and bind the tooth rigidly to the strut.

Figure 5:
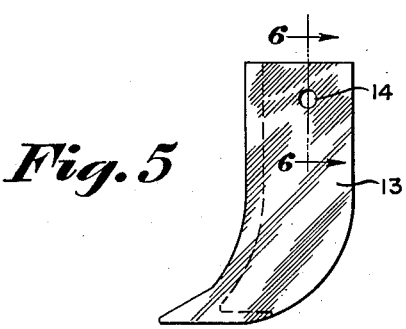
Figure 5 is a side elevation of a modified form of tooth.
Figure 6:
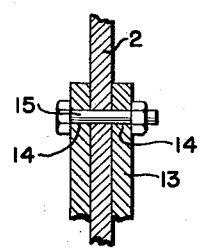
Figure 6 is a fragmentary vertical section taken on the line 6—6 of Figure 5.

In Figures 5 and 6 a slightly modified form of securing means has been shown. The tooth shown in Figures 5 and 6 is identical with that previously described except that the strap 10 is omitted. This tooth 13 is provided with openings 14 in the upper side walls to receive a clamping bolt 15. It will be necessary of course to provide a similar opening in the strut.

In use the teeth will be slipped onto one of the struts 2 with the toe of the strut fitting into the pocket 8. With the form of the invention first described, the wedge 12 will then be driven home, locking the tooth to the strut. As wear occurs, the wedge can be driven in further to tighten the tooth and hold it rigidly in place. With the form of the invention shown in Figures 5 and 6, the bolt 15 is inserted through the tooth and strut and the nut tightened. It is of course obvious that as wear occurs the nut can be tightened to a greater degree, thus keeping the tooth in firm position on the end of the strut.

While in the above there has been described two embodiments of the invention, it will be obvious that the invention may take other forms within the scope of the appended claims.

Having thus fully described my invention, I claim:

1. A scarifier tooth comprising, a body forming a boot member adapted to be disposed about a scarifier supporting strut of substantially rectangular cross-section curved forwardly at its lower end and tapered to form a forwardly disposed toe portion, said body having a vertically disposed shank curved forwardly at its lower end and tapered to a ground-engaging point, a rearwardly opening axially disposed recess in said shank shaped to conform to the contours of said strut along a substantial portion of the length thereof and extending into said point to form a pocket for receiving the toe of said strut, said body having a skid portion at the bottom thereof forming a base for said recess against which the bottom of said strut is to be disposed, and means bridging said recess at the rear thereof forming a downwardly inclined seat for a wedge member adapted to guide the wedge member into frictional clamping relation with the rear of said supporting strut over a large area thereof, whereby said scarifier tooth is disposed in abutting relation with said supporting strut throughout the front and base thereof and rigidly clamped thereto irrespective of deformations of the surface of said supporting strut or said recess due to wear.

2. A scarifier tooth comprising, a body forming a boot member adapted to be disposed in surrounding relation with a scarifier supporting strut of substantially rectangular cross-section curved forwardly at its lower end and tapered to form a forwardly disposed toe portion, said body having a vertically disposed shank curved forwardly at its lower end and tapered to a ground-engaging point, a rearwardly opening axially disposed recess in said shank shaped to conform to the contours of said strut along a substantial portion of the length thereof and extending into said point to form a pocket for receiving the toe of said strut, said body having a skid portion at the bottom thereof forming a base for said recess against which the bottom of said strut is to be disposed, and means forming a downwardly inclined wedge seat bridging said recess at the rear thereof for guiding a wedge member into abutting relation with the rear of said supporting strut to urge said supporting strut forwardly and downwardly relative to said recess and bind said supporting strut against the front wall and base of said recess throughout the length thereof irrespective of deformations of the surface of said supporting strut or said recess due to wear.

HARRY T. CORBELL.

REFERENCES CITED

The following references are of record in the file of this patent:

UNITED STATES PATENTS

| Number | Name | Date |
|---|---|---|
| 915,809 | Thomas | Mar. 23, 1909 |
| 1,230,302 | Jones | June 19, 1917 |
| 1,595,112 | Mentzer | Aug. 10, 1926 |
| 1,605,861 | Snyder et al. | Nov. 2, 1926 |
| 2,222,071 | Gustafson | Nov. 19, 1940 |